(12) United States Patent
Ju et al.

(10) Patent No.: US 8,723,678 B2
(45) Date of Patent: May 13, 2014

(54) DEVICE AND METHOD FOR DETECTING LOADING OF BATTERY

(75) Inventors: Ho-Jung Ju, Hwaseong-si (KR); Jung-Woo Ha, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1165 days.

(21) Appl. No.: 12/652,386

(22) Filed: Jan. 5, 2010

(65) Prior Publication Data

US 2010/0182155 A1 Jul. 22, 2010

(30) Foreign Application Priority Data

Jan. 20, 2009 (KR) ........................ 10-2009-0004380

(51) Int. Cl.
*G08B 21/00* (2006.01)

(52) U.S. Cl.
USPC ........ 340/636.1; 340/657; 340/660; 340/664; 320/106; 320/128; 320/165

(58) Field of Classification Search
USPC .......................... 340/657, 660, 661, 662–664
See application file for complete search history.

(56) References Cited

U.S. PATENT DOCUMENTS

| | | | | |
|---|---|---|---|---|
| 4,560,937 A | * | 12/1985 | Finger | 324/433 |
| 5,291,118 A | * | 3/1994 | Kojima | 320/150 |
| 5,422,560 A | | 6/1995 | Yan | |
| 5,677,615 A | * | 10/1997 | Takano et al. | 320/152 |
| 5,854,551 A | * | 12/1998 | Lilja et al. | 320/163 |
| 6,340,876 B1 | * | 1/2002 | Saint-Pierre | 320/106 |
| 6,420,854 B1 | * | 7/2002 | Hughes et al. | 320/165 |
| 7,106,200 B2 | * | 9/2006 | Hall et al. | 340/572.3 |
| 7,847,516 B2 | * | 12/2010 | Kung et al. | 320/106 |
| 8,063,606 B2 | * | 11/2011 | Veselic | 320/119 |
| 2007/0182366 A1 | | 8/2007 | Lee | |
| 2010/0045238 A1 | * | 2/2010 | Jau et al. | 320/128 |

FOREIGN PATENT DOCUMENTS

| | | |
|---|---|---|
| JP | 2005117871 | 4/2005 |
| JP | 2005253128 | 9/2006 |
| KR | 1020080082743 | 9/2008 |

\* cited by examiner

*Primary Examiner* — Daniel Wu
*Assistant Examiner* — Son M Tang
(74) *Attorney, Agent, or Firm* — F. Chau & Associates, LLC

(57) ABSTRACT

A battery load detecting device includes: a battery check pulse generator generating a check pulse in response to a check enable signal; a constant voltage regulator generating a battery status signal in response to a first battery check signal; and a battery detection determining unit comparing a predetermined reference signal with the battery status signal to generate a comparison result signal, using the comparison result signal and the check pulse to generate a second battery check signal, and using the second battery check signal to generate a battery detection signal indicating whether a chargeable battery is electrically connected to the constant voltage regulator.

20 Claims, 6 Drawing Sheets

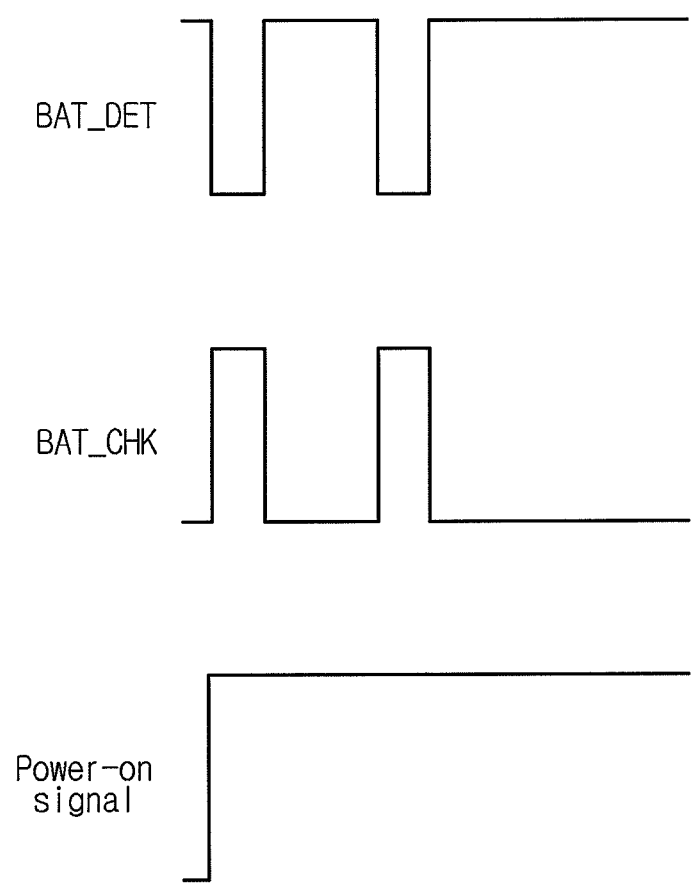

DEVICE AND METHOD FOR DETECTING LOADING OF BATTERY

CROSS-REFERENCE TO RELATED APPLICATION

This U.S. non-provisional patent application claims priority under 35 U.S.C. §119 to Korean Patent Application 10-2009-0004380, filed on Jan. 20, 2009, in the Korean Intellectual Property Office, the disclosure of which is incorporated by reference herein in its entirety.

BACKGROUND

1. Technical Field

The present inventive concept relates to battery technology, and more particularly, to a device and method for detecting the existence/non-existence of a rechargeable battery within a battery charger.

2. Discussion of the Related Art

With the development of mobile communication systems, various types of charging devices for charging secondary batteries, such as rechargeable batteries, have been developed.

A charging device may employ a battery load detecting technique which detects whether a rechargeable battery, such as a lithium ion battery, is electrically connected to or disconnected from the charging device and displays the detection result.

In an example battery load detection method, a thermistor or a built-in resistor terminal is provided in a secondary battery. In this case, a voltage generated when a current flows through the thermistor or the built-in resistor terminal is checked to determine whether the battery is loaded (e.g., electrically connected to a battery charger).

When a thermistor or a built-in resistor terminal is not provided in a secondary battery, other battery load detecting methods may be used. For example, in some detecting methods, a detecting element, such as an inductor or a capacitor, is separately provided outside the charging device.

In addition, there is a method of detecting whether a battery is loaded inside a circuit without using a separate external element. However, in this method, when the battery is unloaded (e.g., electrically disconnected from the circuit) or loaded (e.g., electrically connected to the circuit), a peak voltage needs to be equal to or higher than a predetermined voltage to detect the loading of the battery. However, in this method, the predetermined voltage is set to a normal mode value.

Therefore, there exists a need to provide a technique which can accurately detect whether a secondary battery is connected to a battery charger, regardless of a charging mode of the charger, without using a separate external element.

SUMMARY

An exemplary embodiment of the inventive concept provides a battery load detecting device capable of detecting whether a battery is loaded in a battery charger.

An exemplary embodiment of the inventive concept also provides a device and method for detecting whether a battery is loaded in a battery charger without using a detecting circuit element, such as an inductor or a capacitor.

An exemplary embodiment of the inventive concept also provides a device and method for detecting whether a battery is electrically connected to a charging circuit regardless of a charging mode of a battery charging device.

An exemplary embodiment of the inventive concept also provides a battery load detecting device that detects whether a battery is loaded in a battery charger whose charging mode is changed from a constant current charging mode (CCCM) to a constant voltage charging mode (CVCM).

In an exemplary embodiment of the inventive concept, there is provided a battery load detecting device including: a battery check pulse generator generating a check pulse in response to a check enable signal; a constant voltage regulator generating a battery status signal in response to a first battery check signal; and a battery detection determining unit comparing a predetermined reference signal with the battery status signal to generate a comparison result signal, using the comparison result signal and the check pulse to generate a second battery check signal, and using the second battery check signal to generate a battery detection signal indicating whether a chargeable battery is electrically connected to the constant voltage regulator.

The battery check pulse generator may include: an OR gate receiving the check enable signal and an inverted check pulse and generating an OR response; a first delay section delaying the OR response for a predetermined period of time and inverting the OR response; a NAND gate receiving the OR response and the inverted OR response, generating a NAND response, and outputting the NAND response as the check pulse; and a second delay section delaying and inverting the check pulse and providing the inverted pulse as the inverted check pulse to the OR gate.

The constant voltage regulator may include: a current mirror unit supplying a current to a battery electrically connected to the constant voltage regulator in response to a regulating voltage to charge the battery, and outputting a voltage having a first level as the battery status signal since the battery is electrically connected to the constant voltage regulator, when the first battery check signal is applied to the constant voltage regulator; and a charging mode control unit connected to the current mirror unit and generating the regulating voltage according to a charging mode of a battery charger including the battery load detecting device to regulate the current supplied to the battery that is electrically connected to the constant voltage regulator and the voltage level of the battery status signal.

The current mirror unit outputs a voltage having a second level as the battery status signal when the battery is electrically disconnected from the constant voltage regulator, when the first battery check signal is applied to the constant voltage regulator.

When the charging state of the battery reaches a predetermined state, to change the charging mode of the battery charger from a CCCM to a CVCM, the charging mode control unit may compare a current sensing value and a voltage sensing value output from the current mirror unit with reference current and voltage values, respectively, and apply a resultant voltage of the comparison result values to gates of MOS transistors in the current mirror unit, which are connected in series to each other, as the regulating voltage.

The battery detection determining unit may include: a comparator comparing the predetermined reference signal with the battery status signal and outputting the comparison result signal; a NAND gate performing a NAND operation on the comparison result signal output from the comparator and the check pulse output from the battery check pulse generator to generate the second battery check signal; and an inverter inverting the second battery check signal output from the NAND gate and outputting the inverted signal as the battery detection signal.

A circuit that generates the check enable signal may generate the check enable signal when a battery charger including the battery load detecting device is turned on or a battery is removed from the battery charger.

A circuit that generates the check enable signal may generate the check enable signal when a charging mode of a battery charger including the battery load detecting device is changed or a charging end signal is generated.

The check pulse may be maintained in a first state for a predetermined period of time.

The constant voltage regulator charges a battery that is electrically connected to the constant voltage regulator.

In an exemplary embodiment of the inventive concept, there is provided a method of detecting whether a battery is loaded within a battery charger including: generating a check pulse that is maintained in a first state for a predetermined period of time; while the check pulse is maintained in the first state, changing a voltage of a battery charging pin terminal of a battery charger to be equal to a set checking voltage; and after the first period of time has elapsed, measuring a difference in a level of the voltage of the battery charging pin terminal and a level of the set checking voltage to obtain a battery detection signal indicating whether a battery is loaded within the battery charger.

The set checking voltage may be higher or lower than a full charge voltage of a battery loaded within the battery charger.

No difference in the voltage levels is measured when a battery is electrically connected to the battery charging pin terminal.

A difference in the voltage levels is measured when a battery is not electrically connected to the battery charging pin terminal.

The check pulse may be generated in response to a rising edge of a check enable signal.

The check enable signal may be generated in response to a power-on signal of the battery charger, an end-of-charge signal of the battery charger, a change in a charging mode of the batter charger or removal of a battery from the battery charger.

In an exemplary embodiment of the inventive concept, a battery load detecting device, includes: a constant voltage regulator charging a battery; a battery check pulse generator generating a first check pulse in response to an indication that the battery is being charged by the constant voltage regulator; a battery detection determining unit outputting a first battery check signal to the constant voltage regulator to cause the constant voltage regulator to output a first battery status signal, comparing the first battery status signal with a predetermined reference signal to generate a first comparison signal, using the first comparison signal and the first check pulse to generate a second battery check signal and inverting the second battery check signal as a first battery detection signal indicating that the battery is being charged by the constant voltage regulator; and a light emitting device illuminating in response to the first battery detection signal.

The battery check pulse generator generates a second check pulse in response to an indication that the battery is no longer being charged by the constant voltage generator; the battery detection determining unit outputs a third battery check signal to the constant voltage regulator to cause the constant voltage regulator to output a second battery status signal, compares the second battery status signal with the predetermined reference signal to generate a second comparison signal, uses the second comparison signal and the second check pulse to generate a fourth battery check signal and inverts the fourth battery check signal as a second battery detection signal indicating that the battery is no longer being charged by the constant voltage regulator.

In response to the second battery detection signal, the light emitting device may be turned off or illuminate a color different than a color illuminated by the light emitting device when the battery is being charged by the constant voltage regulator.

According to the above-mentioned exemplary embodiments of the inventive concept, it is possible to reduce the cost of a detecting circuit element and accurately detect whether a battery is electrically connected to a charging circuit, regardless of a charging mode of a charging device.

BRIEF DESCRIPTION OF THE DRAWINGS

The above and other features of the inventive concept will become more apparent by describing in detail exemplary embodiments thereof with reference to the attached drawings in which:

FIGS. 4A to 4C are timing charts illustrating simulation examples of the battery load detecting device shown in FIG. 1 in various operating modes.

DETAILED DESCRIPTION OF THE EMBODIMENTS

Hereinafter, a device and method for detecting whether a rechargeable battery is loaded within a battery charger according to exemplary embodiments of the inventive concept will be described with reference to the accompanying drawings.

The inventive concept may, however, may be embodied in many alternate forms and should not be construed as limited to only the exemplary embodiments set forth herein.

It will be understood that when an element is referred to as being "connected" or "coupled" to another element, it can be directly connected or coupled to the other element or intervening elements may be present.

Figure 1:
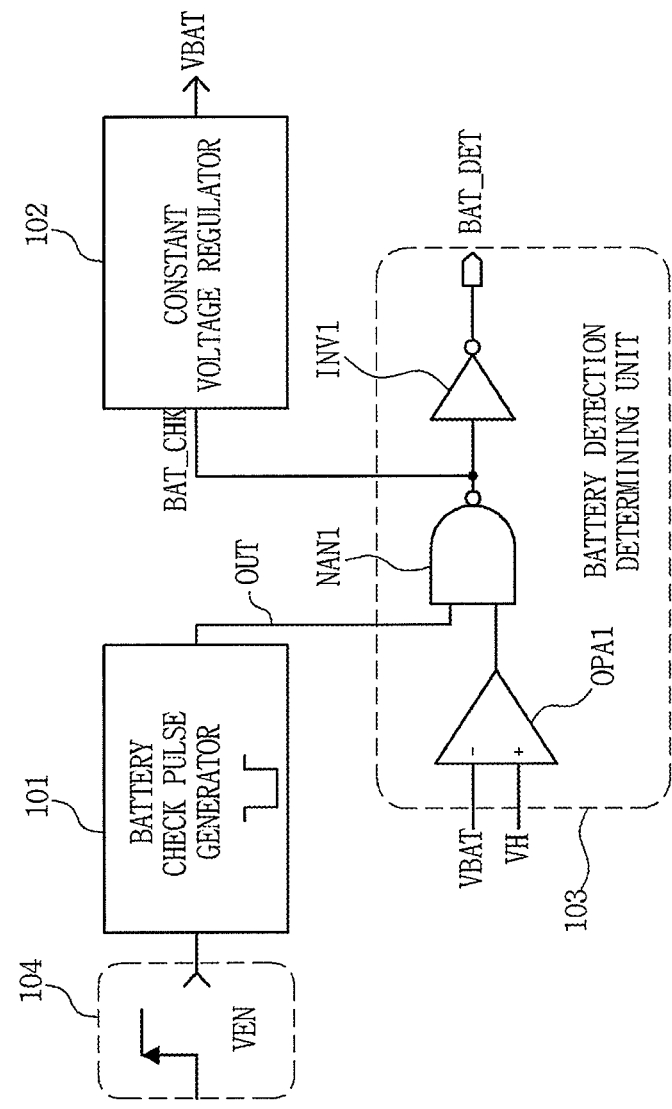
FIG. 1 is a block diagram illustrating a battery load detecting device according to an exemplary embodiment of the inventive concept.

FIG. 1 is a block diagram illustrating a battery load detecting device according to an exemplary embodiment of the inventive concept. The inventive concept can be used with any apparatus using batteries, but the battery load detecting device shown in FIG. 1 is applied to, for example, a battery charger.

In FIG. 1, a circuit block 101 indicates a battery check pulse generator, a circuit block 102 indicates a constant voltage regulator, and a circuit block 103 indicates a battery detection determining unit.

The battery check pulse generator 101 generates a check pulse OUT that is maintained in a first state for a predetermined period of time in response to a check enable signal applied from a circuit block 104.

The constant voltage regulator 102 charges a battery, which is a load, and generates a battery status signal VBAT in response to a battery check signal BAT_CHK.

The battery detection determining unit 103 combines a comparison result signal obtained by comparing a predetermined reference signal VH with the battery status signal VBAT with the check pulse OUT output from the battery check pulse generator 101 to generate the battery check signal BAT_CHK, and generates a battery detection signal BAT_DET indicating whether the battery is connected to the constant voltage regulator 102 on the basis of the generated battery check signal.

As shown in FIG. 1, the battery detection determining unit 103 includes: a comparator OPA1 that compares the predetermined reference signal VH with the battery status signal VBAT and outputs the comparison result signal; a NAND gate NAN1 that performs a NAND operation on the comparison result signal output from the comparator OPA1 and the check pulse OUT output from the battery check pulse generator 101 to generate the battery check signal BAT_CHK; and an inverter INV1 that inverts the battery check signal BAT_CHK output from the NAND gate NAN1 and outputs the inverted signal as the battery detection signal BAT_DET.

The circuit block 104 may generate the check enable signal that transits from a low level to a high level when the charger is turned on or when the battery is removed from the charger. The circuit block 104 may also generate the check enable signal when the charging mode of the charger is changed or when a charging end signal is generated.

Figure 2:
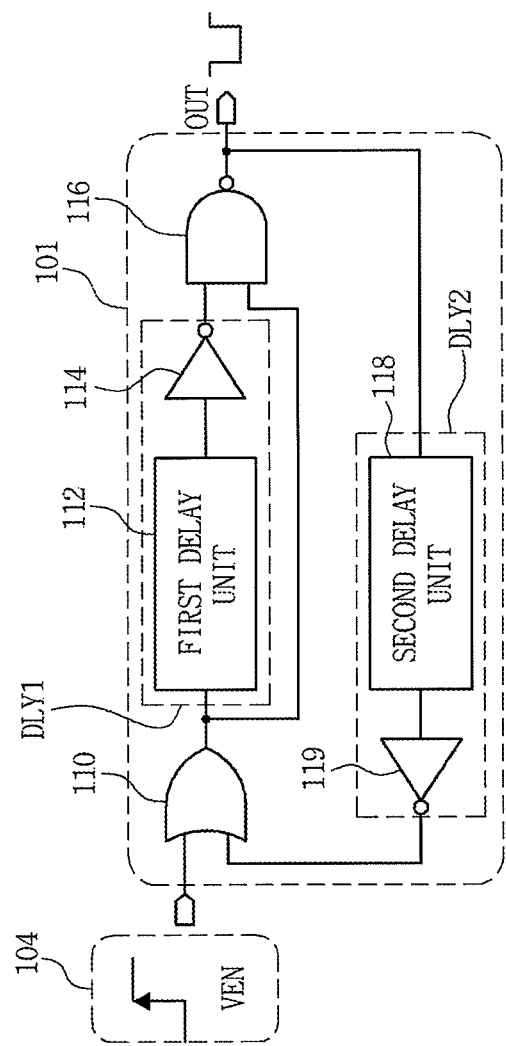
FIG. 2 is a circuit diagram illustrating an exemplary embodiment of a battery check pulse generator shown in FIG. 1.

FIG. 2 is a circuit diagram illustrating an exemplary embodiment of the battery check pulse generator shown in FIG. 1.

Referring to FIG. 2, the battery check pulse generator 101 includes: an OR gate 110 that receives the check enable signal and the inverted check pulse which is fed back to the OR gate 110 and generates an OR response; a first delay section DLY1 that delays the OR response for a predetermined period of time and inverts the OR response; a NAND gate 116 that receives the OR response and the output of the first delay section DLY1, generates a NAND response, and outputs the NAND response as the check pulse; and a second delay section DLY2 that delays and inverts the check pulse and outputs the processed pulse as the inverted check pulse to the OR gate 110. The first delay section DLY1 includes a first delay unit 112 and an inverter 114, and the second delay section DLY2 includes a second delay unit 118 and an inverter 119.

Figure 3:
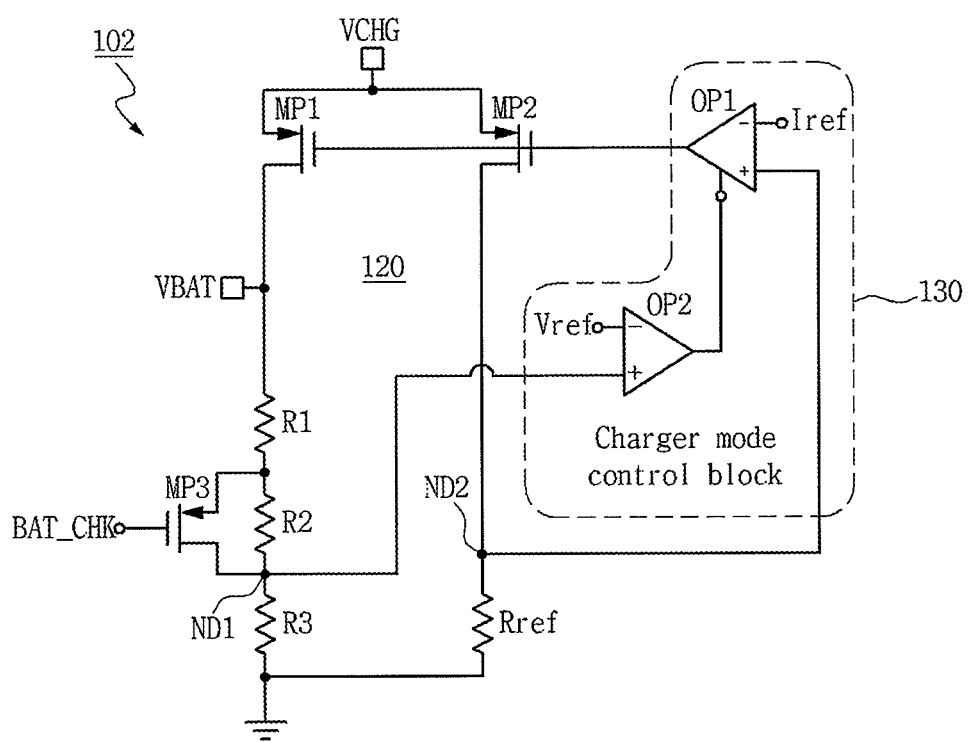
FIG. 3 is a circuit diagram illustrating an exemplary embodiment of a constant voltage regulator shown in FIG. 1.

FIG. 3 is a circuit diagram illustrating an exemplary embodiment of the constant voltage regulator shown in FIG. 1.

Referring to FIG. 3, the constant voltage regulator 102 includes three p-type MOS transistors MP1, MP2, and MP3 and resistors R1, R2, R3, and Rref. The constant voltage regulator 102 may include: a current mirror unit 120 that supplies a current to the battery in response to a regulating voltage to charge the battery, and outputs different voltage levels as the battery status signal according to whether the battery is connected as a load when the battery check signal is applied; and a charging mode control unit 130 that is connected to the current mirror unit 120 and generates the regulating voltage according to the charging mode of the charger to regulate the current and voltage.

The charging mode control unit 130 includes first and second comparators OP1 and OP2. Therefore, when the battery charging state reaches a set state, to change the charging mode from a constant current charging mode (CCCM) to a constant voltage charging mode (CVCM), the charging mode control unit 130 may compare a current sensing value and a voltage sensing value output from the current mirror unit 120 with reference values Iref and Vref, and apply a resultant voltage of the comparison result values to the gates of the MOS transistors MP1 and MP2, which are connected in series to each other, as the regulating voltage.

Figure 4B:
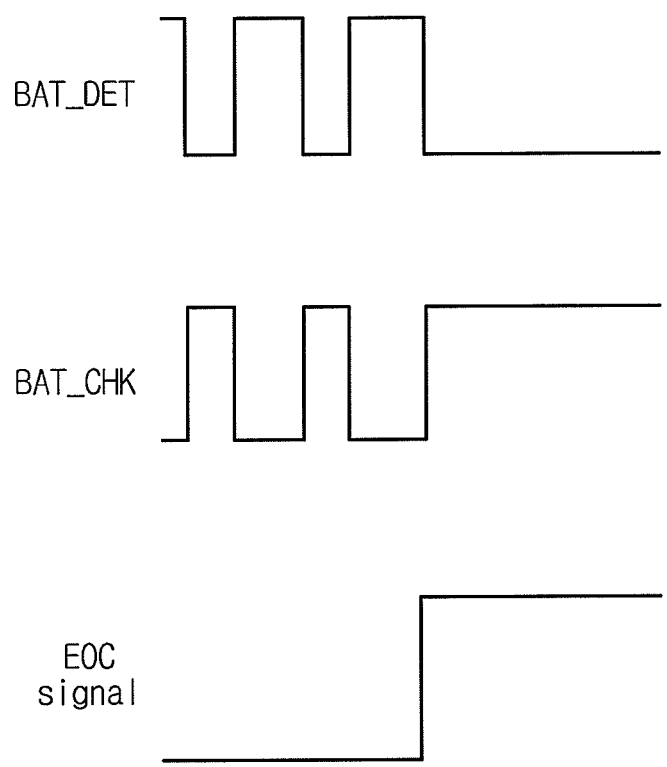
Figure 4C:
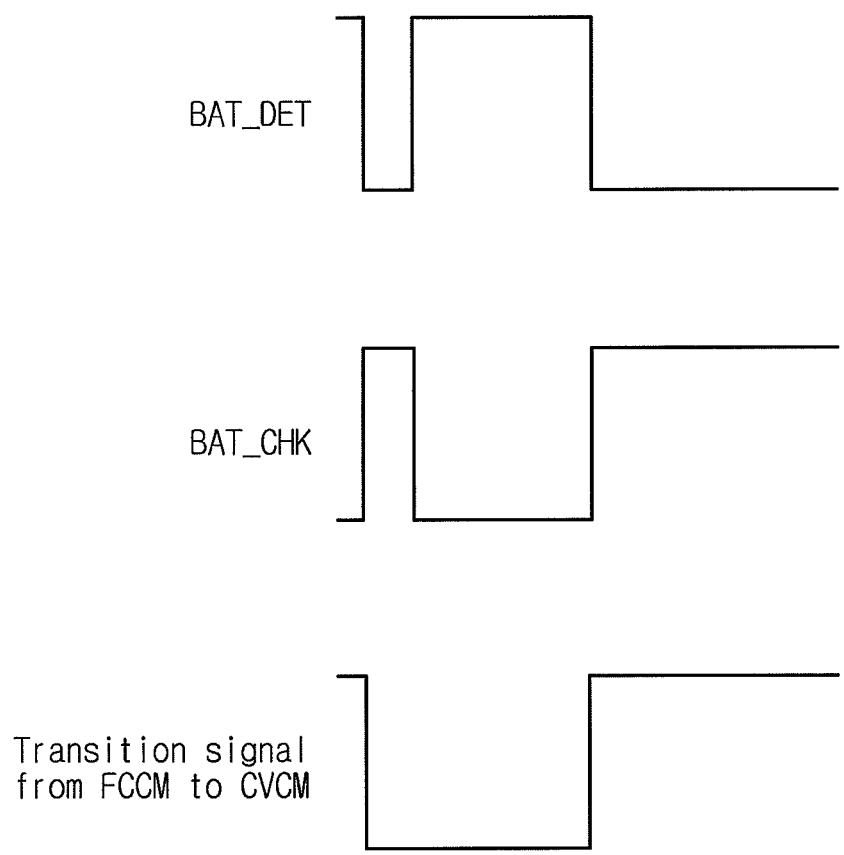

FIGS. 4A to 4C are timing charts illustrating simulation examples of the battery load detecting device shown in FIG. 1 in various operation modes.

FIG. 4A is a timing chart illustrating a simulation example performed under normal charging conditions. If a power-on signal transitions from a low level to a high level, the battery check signal BAT_CHK is maintained at a high level for a predetermined time period. At that time, if there is any battery electrically connected to the charger including the battery load detecting device, the battery detection signal BAT_DET is output at the high level as shown in FIG. 4A.

FIG. 4B is a timing chart illustrating a simulation example when a battery is removed from the charger having the battery load detecting device in the CVCM. If a loaded battery is removed from the charger in the CVCM, an EOC signal is activated so as to transition from a low level to a high level. Accordingly, the battery check signal BAT_CHK is maintained at a high level for a predetermined time period. Then, according to whether there is any battery electrically connected to the charger, the battery detection signal BAT_DET is output. For example, if there is a battery electrically connected to the charger, the battery detection signal BAT_DET is output at a low level as shown in FIG. 4B.

FIG. 4C is a timing chart illustrating a simulation example when a loaded battery is removed from the charger having the battery load detecting device such that the operation mode of the charger is changed from the FCCM to the CVCM. If a signal indicating the transition of the operation mode from the FCCM to the CVCM is activated to transition from a low level to a high level, the battery check signal BAT_CHK is maintained at a high level for a predetermined time period. Then, according to whether there is any battery electrically connected to the charger, the battery detection signal BAT_DET is output. For example, if there is a battery electrically connected to the charger, the battery detection signal BAT_DET is output at a low level as shown in FIG. 4C.

Next, an example of a battery load detecting operation used by a battery load detecting device having the structure shown in FIG. 1 will be described in detail.

The battery load detecting operation according to an exemplary embodiment of the inventive concept includes a process of generating a check pulse that is maintained in the first state for a predetermined period of time to check whether a battery is loaded. Then, while the check pulse is maintained in the first state, a pin node voltage of the battery is changed to a set check voltage. Then, a variation in the level of the pin node voltage is detected to obtain a battery detection signal indicating whether the battery is loaded to the charger.

In this case, the set check voltage may be lower or higher than the level of the full charge voltage of the battery.

To detect the loading of the battery, the detecting device shown in FIG. 1 may be used.

Referring to FIG. 1 again, the battery check pulse generator 101 generates a command to change the voltage of a charging pin terminal that is electrically connected to the charging terminal of the battery when the battery is loaded in a short time, in other words, the check pulse OUT.

The constant voltage regulator 102 that charges the battery connected as a load controls the voltage of the charging pin terminal to be slightly lower or higher than the full charge voltage of the battery in response to the battery check signal BAT_CHK. The level of the battery status signal VBAT is higher or lower than that of the predetermined reference signal VH according to whether the battery is loaded.

As shown in FIG. 1, the battery detection determining unit 103 generates the battery check signal BAT_CHK and uses the generated battery check signal to generate the battery detection signal BAT_DET indicating whether the battery is connected to the constant voltage regulator 102.

In other words, in the method of detecting the loading of the battery, the voltage of the pin terminal to be connected to the battery is maintained to be slightly higher or lower than the full charge voltage of the battery for a short period of time, e.g., several microseconds to several tens of microseconds, and then a variation in the voltage of the pin terminal is checked. When the battery is electrically connected to the pin terminal and there is a battery load, there is no difference between the voltage of the pin terminal and the voltage maintained before the battery check signal is generated. Therefore, a voltage variation does not occur. On the other hand, when the battery is not electrically connected to the pin terminal and there is no battery load, there is a detectable voltage variation. Therefore, it is possible to easily determine whether the battery is loaded by detecting the voltage variation.

The circuit block 104 generates the check enable signal for operating the battery check pulse generator 101. The circuit block 104 generates a rising signal that transits from a low level to a high level as the check enable signal. The battery check pulse generator 101 generates the check pulse OUT that is maintained at a low level (e.g., first state) for a predetermined period of time in response to the rising edge of the check enable signal.

During the period for which the check pulse OUT is at a low level, the battery check signal BAT_CHK is generated at a high level and is then applied to the constant voltage regulator 102. The constant voltage regulator 102 generates the battery status signal VBAT in response to the battery check signal BAT_CHK. When the battery is connected to the terminal VBAT shown in FIG. 3, there is little variation in the level of the battery status signal VBAT. On the other hand, when the battery is not connected to the terminal, the level of the battery status signal VBAT is equal to a predetermined voltage VREG (which is set to be slightly higher than the full charge voltage of the battery).

Therefore, the comparator OPAL of the battery detection determining unit 103 compares the predetermined reference signal VH with the battery status signal VBAT and outputs the comparison result signal at a low or high level. When the level of the battery status signal VBAT is higher than the voltage level of the predetermined reference signal VH (in this exemplary embodiment, VBAT<VH<VREG), the comparison result signal is output at a low level. When the level of the battery status signal VBAT is lower than the voltage level of the predetermined reference signal VH, the comparison result signal is output at a high level. The NAND gate NAN1 performs a NAND operation on the check pulse OUT and the comparison result signal to generate another battery check signal BAT_CHK. The generated battery check signal BAT_CHK is inverted by the inverter INV1 and is then output as the battery detection signal BAT_DET.

Therefore, in this exemplary embodiment, when the battery detection signal BAT_DET is at a high level, it is determined that the battery is loaded. When the battery detection signal BAT_DET is at a low level, it is determined that the battery is unloaded.

Next, each of the circuit blocks will be described in detail with reference to the drawings.

The check enable signal generating unit 104 shown in FIG. 1 may generate the check enable signal when the charger is turned on, the battery is removed, the charging mode of the charger is changed, or a charging end signal is generated.

For example, the check enable signal may be generated in the following three events. First, the check enable signal may be generated on the basis of a power-on signal generated when an adapter or a universal serial bus (USB) power supply is connected into the charger and the charger is turned on.

Second, the check enable signal may be generated on the basis of a variation in the charging mode. For example, a charger may have three charging modes (a pre-charging mode, a FCCM, and a CVCM. In this case, it is possible to generate the check enable signal by detecting a variation in the charging mode (from the FCCM to the CVCM). If the battery is removed while being charged with the charger, the charging mode is changed to the CVCM (the variation in the charging mode may depend on the design of the charger).

Third, the check enable signal may be generated on the basis of an end of charge (EOC) signal. When the battery is fully charged, the charger generates the EOC signal to notify the completion of charging to the outside. For example, the EOC signal is generated when the current charged to the battery is equal to or less than a predetermined current level. If the battery is removed while being charged, a charging current is reduced, and the EOC signal is similarly generated from an internal EOC circuit. It is possible to generate the check enable signal using the generated internal EOC signal.

The levels of all the signals generated in the above-mentioned three events are changed from a default low level to a high level. Therefore, a buffer and a three-input OR gate may be used to implement the circuit block 104 without any conversion. A detailed description thereof will thus be omitted.

The battery check pulse generator 101 shown in FIG. 2 generates a pulse for maintaining a low level for a predetermined period of time. The first delay unit 112 and the second delay unit 118 for maintaining the low level are circuits that use a general clock signal and a flip-flop circuit to implement a delay, and thus a detailed description thereof will be omitted.

When a check enable signal VEN applied to one input terminal of the OR gate 110 shown in FIG. 2 is changed from a low level to a high level, the value of one input of the NAND gate 116 is changed to a high level, but the value of the other input of the NAND gate 116 is maintained at a value before the amount of delay TDR1 is allocated by the first delay unit 112, in other words, at a low level. Therefore, the check pulse OUT of the NAND gate 116 is changed from a high level to a low level, and the low level is maintained for a time corresponding to the amount of delay TDR1. After the amount of delay TDR1 has elapsed, the check pulse OUT is changed to the high level, but the output of the second delay unit 118 is maintained at a value before the amount of delay TDR2 is allocated, in response to the rising signal of the check pulse OUT. Therefore, the value of the other input of the OR gate 110 is changed to a high level, and the high level is maintained for a time corresponding to the amount of delay TDR2. Even when the input value of the OR gate 110 is changed for the time corresponding to the amount of delay TDR2, the check pulse OUT is not affected by the variation.

FIG. 3 is a diagram illustrating an example of the structure of the constant voltage regulator 102.

The charging mode control unit 130 will not be described in detail.

Briefly, in the structure shown in FIG. 3, a pair of p-type MOS transistors MP1 and MP2 forms a current mirror circuit. A feedback path including the p-type MOS transistor MP2, the resistor Rref, and the comparator OP1 controls the current charged to the battery through the p-type MOS transistor MP1. If the size of the p-type MOS transistor MP1 is K times larger than that of the p-type MOS transistor MP2, a charging current Ichg is represented by Expression 1 given below:

$$Ichg = \frac{K \times Iref}{Rref} \quad \text{[Expression 1]}$$

(where Iref is a reference voltage with respect to a desired charging voltage).

The feedback path including the p-type MOS transistor MP2, the resistor Rref, and the comparator OP1 is operated in the FCCM or the pre-charging mode (e.g, a method of charging the battery with a small amount of current when the battery voltage is low).

A feedback path including the p-type MOS transistor MP1, the resistors R1, R2, and R3, and the comparators OP1 and OP2 is operated in the CVCM. In the CVCM, a VBAT pin node voltage is regulated by Expression 2 given below:

$$VBAT = \frac{(R1 + R3) \times Vref}{R3}. \quad \text{[Expression 2]}$$

When the circuit block 101 is operated, the battery check signal BAT_CHK is changed from a low level to a high level, and the high level is maintained for a predetermined period of time. Then, the p-type MOS transistor MP3 shown in FIG. 3 is turned off, and the voltage of the VBAT node becomes the voltage VREG. As a result, a regulation voltage represented by the following Expression 3 is obtained:

$$VREG = \frac{(R1 + R2 + R3) \times Vref}{R3}. \quad \text{[Expression 3]}$$

Therefore, when the battery is loaded, there is little variation in the voltage VBAT. When the battery is removed, the voltage VBAT is increased to a predetermined voltage VREG by the resistance and the voltage Vref.

For example, in a lithium ion battery, when the battery voltage reaches, for example, 4.2 V, the charging mode is changed from the CCCM to the CVCM. However, since a rapid and large variation in the charging current has an adverse influence on the battery, the battery voltage is regulated to 4.2 V while maintaining a constant charging current. The charging mode control unit 130 has a function of controlling the switching of the charging mode.

In the circuit block 103 shown in FIG. 1, the default output of the comparator OPA1 is at a high level. If the battery check pulse generator 101 is operated to generate a pulse maintaining a low level for a predetermined period of time, the battery check signal BAT_CHK is maintained at a high level for a predetermined period of time. Therefore, the voltage VBAT is regulated to the voltage VREG. If the voltage VBAT is higher than the voltage VH, the output of the comparator OPA1 is at a low level, and the battery check signal BAT_CHK, which is the output of the two-input NAND gate NAN1, is maintained at a high level. Thus, the battery detection signal BAT_DET is maintained at a low level. The low level of the battery detection signal BAT_DET, which is the output signal of the external pin of the charger means that there is no battery connected to the charger. The high level of the battery detection signal BAT_DET indicates that a battery is inserted into the charger. The battery detection signals may allow the color of light emitted from a light emitting diode to be changed such that the user can easily check the loading of the battery.

As described above, in an exemplary embodiment of the inventive concept, the circuit blocks for detecting the loading of the battery are integrated with the battery charger. When the detecting method according to an exemplary embodiment of the inventive concept is applied to a battery charger, it is possible to easily determine whether a battery has been inserted into or removed from the charger regardless of various charging modes of the charger (e.g., the pre-charging mode, the FCCM, and the CVCM).

Further, when the charger is turned on, it is possible to determine whether the battery is loaded on the basis of the enable signal. When the battery is removed in the pre-charging mode and the FCCM, it is possible to determine whether the battery is loaded on the basis of a variation that occurs when changing from the pre-charging mode to the CVCM or from the FCCM to the CVCM. When the battery is removed in the CVCM, it is possible to determine whether the battery is loaded on the basis of the internal EOC signal generated due to a reduction in charging current.

According to the above-mentioned battery load detecting device, it is possible to reduce the cost of a circuit element for detecting the loading of a battery, and it is possible to accurately detect whether a battery is electrically connected to a charging circuit, regardless of the charging modes of the battery charger.

In accordance with an exemplary embodiment of the inventive concept, other circuit elements or other connection structures may be used for the battery check pulse generator and the battery detection determining unit described above.

While the inventive concept has been shown and described with reference to exemplary embodiments thereof, it will be understood by one of ordinary skill in the art that various changes in form and details may be made therein without departing from the spirit and scope of the inventive concept as defined by the following claims.

In the above-described exemplary embodiments of the inventive concept, the battery load detecting device is applied to the battery charger, but the inventive concept is not limited thereto. For example, the inventive concept may be applied to other devices which use batteries or are connectable to batteries.

What is claimed is:
1. A battery load detecting device, comprising:
a battery check pulse generator generating a check pulse in response to a check enable signal;
a constant voltage regulator generating a battery status signal in response to a first battery check signal; and
a battery detection determining unit comparing a predetermined reference signal with the battery status signal to generate a comparison result signal, using the comparison result signal and the check pulse to generate a second battery check signal, and using the second battery check signal to generate a battery detection signal indicating whether a chargeable battery is electrically connected to the constant voltage regulator,
wherein the first battery check signal is generated by the battery detection determining unit prior to the generation of the second battery check signal, and a voltage level of the battery status signal is determined according to whether the chargeable battery is electrically connected to the constant voltage regulator.
2. The battery load detecting device of claim 1, wherein the battery check pulse generator includes:
an OR gate receiving the check enable signal and an inverted check pulse and generating an OR response;
a first delay section delaying the OR response for a predetermined period of time and inverting the OR response;

a NAND gate receiving the OR response and the inverted OR response, generating a NAND response, and outputting the NAND response as the check pulse; and a second delay section delaying and inverting the check pulse and providing the inverted pulse as the inverted check pulse to the OR gate.

3. The battery load detecting device of claim 1, wherein the constant voltage regulator includes:

a current mirror unit supplying a current to a battery electrically connected to the constant voltage regulator in response to a regulating voltage to charge the battery, and outputting a voltage having a first level as the battery status signal since the battery is electrically connected to the constant voltage regulator, when the first battery check signal is applied to the constant voltage regulator; and a charging mode control unit connected to the current mirror unit and generating the regulating voltage according to a charging mode of a battery charger including the battery load detecting device to regulate the current supplied to the battery that is electrically connected to the constant voltage regulator and the voltage level of the battery status signal.

4. The battery load detecting device of claim 3, wherein the current mirror unit outputs a voltage having a second level as the battery status signal when the battery is electrically disconnected from the constant voltage regulator, when the first battery check signal is applied to the constant voltage regulator.

5. The battery load detecting device of claim 3, wherein, when the charging state of the battery reaches a predetermined state, to change the charging mode of the battery charger from a constant current charging mode to a constant voltage charging mode, the charging mode control unit compares a current sensing value and a voltage sensing value output from the current mirror unit with reference current and voltage values, respectively, and applies a resultant voltage of the comparison result values to gates of MOS transistors in the current mirror unit, which are connected in series to each other, as the regulating voltage.

6. The battery load detecting device of claim 1, wherein the battery detection determining unit includes:

a comparator comparing the predetermined reference signal with the battery status signal and outputting the comparison result signal;

a NAND gate performing a NAND operation on the comparison result signal output from the comparator and the check pulse output from the battery check pulse generator to generate the second battery check signal; and an inverter inverting the second battery check signal output from the NAND gate and outputting the inverted signal as the battery detection signal.

7. The battery load detecting device of claim 1, further comprising a circuit that generates the check enable signal when a battery charger including the battery load detecting device is turned on or a battery is removed from the battery charger.

8. The battery load detecting device of claim 1, further comprising a circuit that generates the check enable signal when a charging mode of a battery charger including the battery load detecting device is changed or a charging end signal is generated.

9. The battery load detecting device of claim 1, wherein the check pulse is maintained in a first state for a predetermined period of time.

10. The battery load detecting device of claim 1, wherein the constant voltage regulator charges a battery that is electrically connected to the constant voltage regulator.

11. A method of detecting whether a battery is loaded within a battery charger, comprising:

generating a check pulse that is maintained in a first state for a predetermined period of time;

while the check pulse is maintained in the first state, generating a set checking voltage and applying the set checking voltage to a battery charging pin terminal of a battery charger; and measuring a difference in the level of the voltage of the battery charging pin terminal by comparing the level of the voltage of the battery charging pin terminal with a reference voltage to obtain a battery detection signal indicating whether a battery is loaded within the battery charger.

12. The method of claim 11, wherein the set checking voltage is higher than a full charge voltage of a battery loaded within the battery charger.

13. The method of claim 11, wherein the set checking voltage is lower than a full charge voltage of a battery loaded within the battery charger.

14. The method of claim 11, wherein no difference in the voltage levels is measured in response to a battery being electrically connected to the battery charging pin terminal.

15. The method of claim 11, wherein a difference in the voltage levels is measured in response to a battery not being electrically connected to the battery charging pin terminal.

16. The method of claim 11, wherein the check pulse is generated in response to a rising edge of a check enable signal.

17. The method of claim 16, wherein the check enable signal is generated in response to a power-on signal of the battery charger, an end-of-charge signal of the battery charger, a change in a charging mode of the batter charger or removal of a battery from the battery charger.

18. A battery load detecting device, comprising:

a constant voltage regulator charging a battery;

a battery check pulse generator generating a first check pulse when the battery is being charged by the constant voltage regulator;

a battery detection determining unit outputting a first battery check signal to the constant voltage regulator to cause the constant voltage regulator to output a first battery status signal, comparing the first battery status signal with a predetermined reference signal to generate a first comparison signal, using the first comparison signal and the first check pulse to generate a second battery check signal and inverting the second battery check signal as a first battery detection signal indicating that the battery is being charged by the constant voltage regulator; and a light emitting device illuminating in response to the first battery detection signal, wherein the constant voltage regulator outputs the first battery status signal according to a voltage level of the first battery check signal.

19. The device of claim 18, wherein the battery check pulse generator generates a second check pulse when the battery is no longer being charged by the constant voltage generator;

the battery detection determining unit outputs a third battery check signal to the constant voltage regulator to cause the constant voltage regulator to output a second battery status signal, compares the second battery status signal with the predetermined reference signal to generate a second comparison signal, uses the second comparison signal and the second check pulse to generate a fourth battery check signal and inverts the fourth battery check signal as a second battery detection signal indicating that the battery is no longer being charged by the constant voltage regulator.

20. The device of claim 19, wherein in response to the second battery detection signal, the light emitting device is turned off or illuminates a color different than a color illuminated by the light emitting device when the battery is being charged by the constant voltage regulator.

* * * * *